United States Patent

Huber et al.

[11] Patent Number: 6,039,288
[45] Date of Patent: Mar. 21, 2000

[54] FLOOR UNIT

[75] Inventors: Thomas Huber, Iffeldorf; Martin Dürrwaechter, Irschenberg, both of Germany

[73] Assignee: Telair International GmbH, Hausham, Germany

[21] Appl. No.: 09/030,753

[22] Filed: Feb. 25, 1998

[30] Foreign Application Priority Data

Mar. 10, 1997 [DE] Germany ............................ 197 09 751
Mar. 24, 1997 [DE] Germany ............................ 197 12 278

[51] Int. Cl.[7] ................. B64C 1/20; B64C 1/22; B64D 47/00
[52] U.S. Cl. .................... 244/118.1; 244/137.1; 193/35 MD
[58] Field of Search ............. 244/118.1, 118.2, 244/137.1; 193/35 MD

[56] References Cited

U.S. PATENT DOCUMENTS

| 3,592,145 | 7/1971 | Petry | 108/51 |
|---|---|---|---|
| 3,763,980 | 10/1973 | Vom Stein et al. | 193/35 R |
| 3,902,583 | 9/1975 | Laibson et al. | 193/35 |
| 4,000,870 | 1/1977 | Davies | 244/137.1 |
| 4,696,583 | 9/1987 | Gorges | 384/49 |
| 5,033,601 | 7/1991 | Huber | 244/137.1 |
| 5,390,775 | 2/1995 | Herrick et al. | 193/35 R |
| 5,538,346 | 7/1996 | Frias et al. | 384/49 |

FOREIGN PATENT DOCUMENTS

| 0649802 | 4/1995 | European Pat. Off. . |
| 3421345 | 12/1985 | Germany . |

Primary Examiner—J. Woodrow Eldred
Attorney, Agent, or Firm—Howard & Howard

[57] ABSTRACT

A floor unit for use as part of the cargo deck of an aircraft to facilitate the reception and repositioning of cargo comprises a hollow profile (11) with a continuous covering surface (12) and a floor surface (13) disposed in parallel thereto. The covering surface (12) and the floor surface (13) are separated from one another by several profile webs (14, 15, 16, 17, 18, 19) running in the long direction of the floor unit. The covering surface comprises a plurality of receptacle openings to receive ball elements.

15 Claims, 4 Drawing Sheets

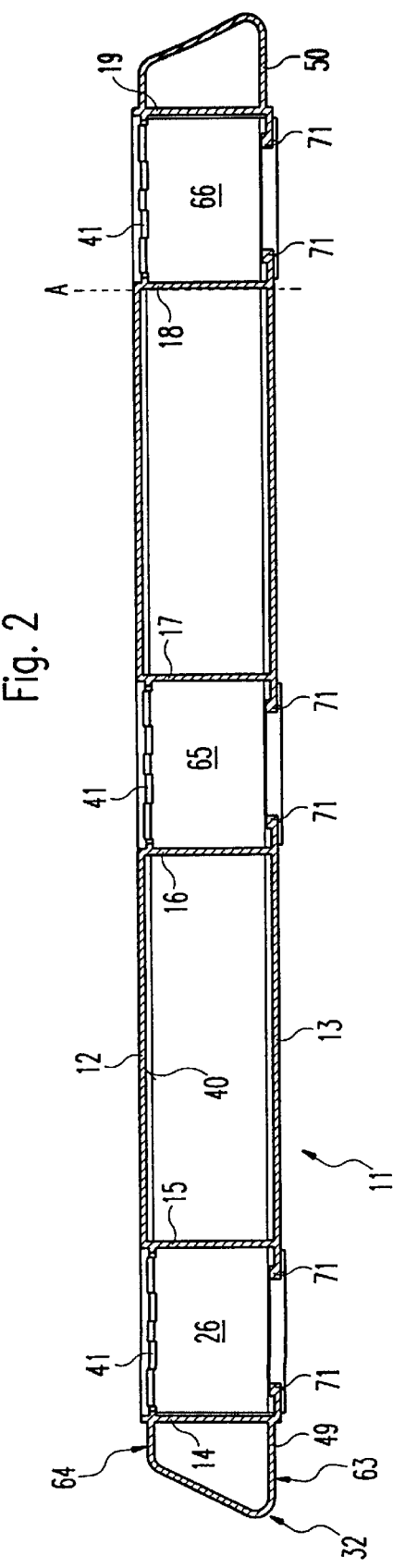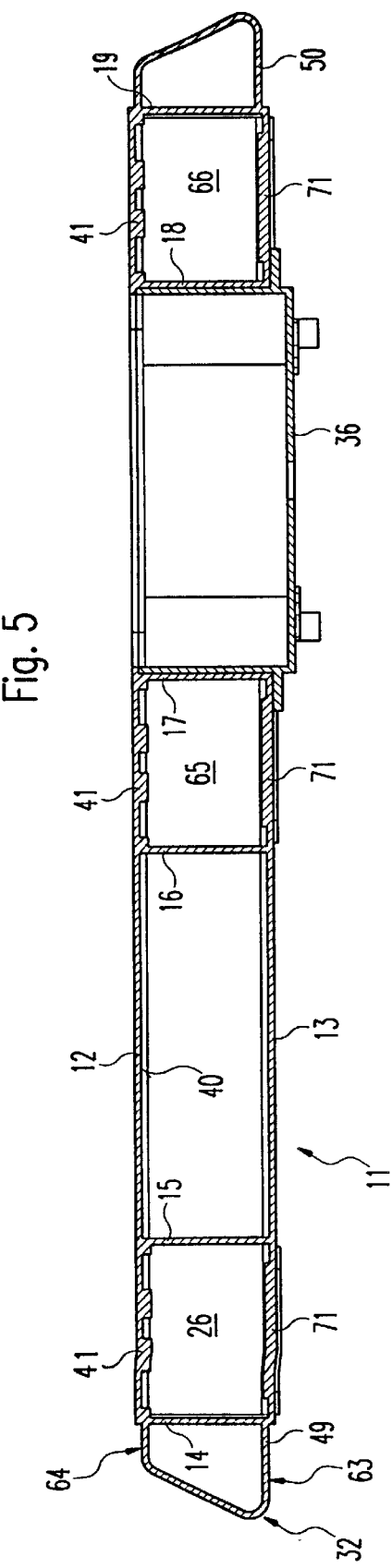

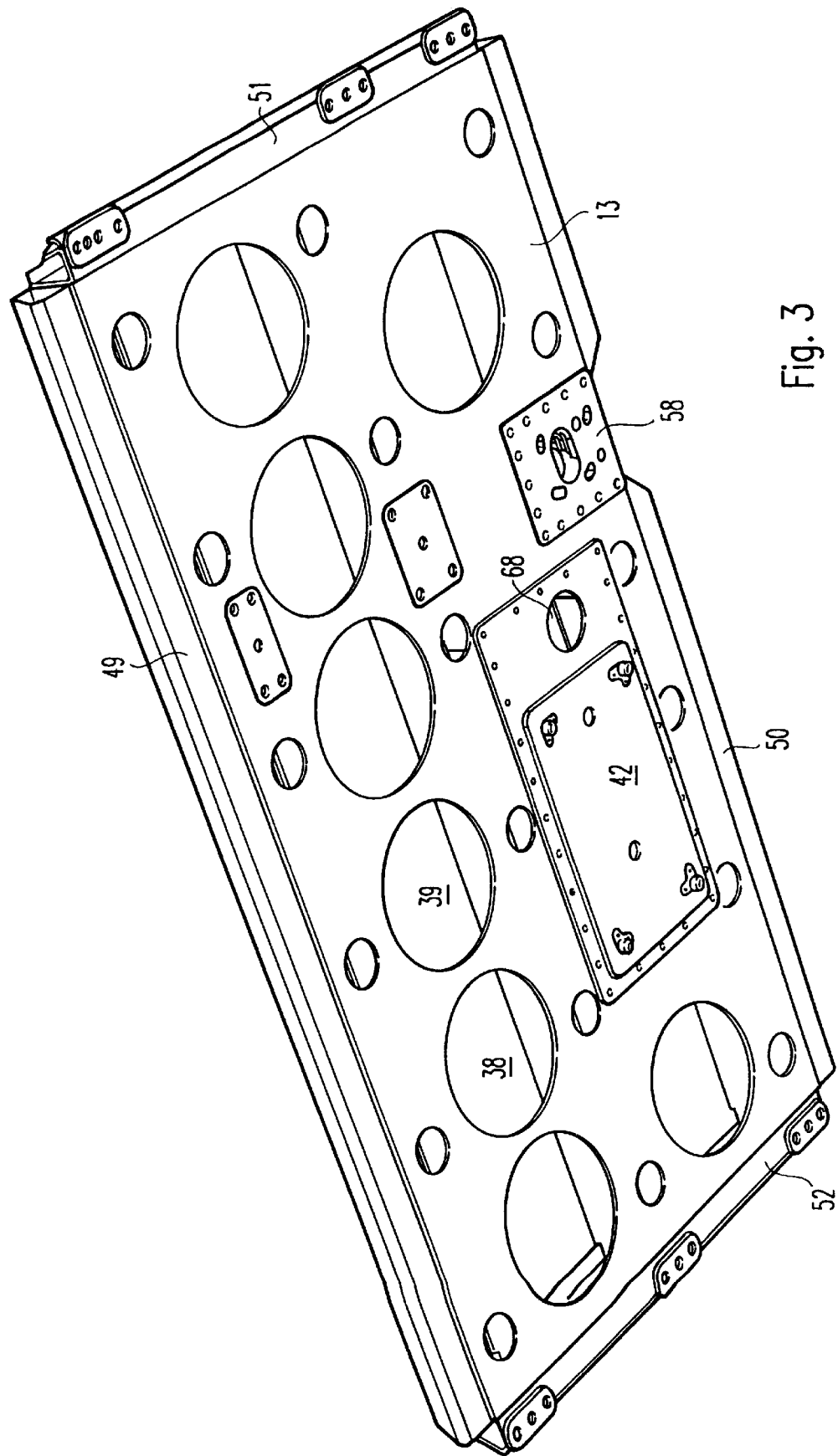

FLOOR UNIT

FIELD OF THE INVENTION

The invention relates to a floor unit for use as part of the cargo deck of an aircraft to facilitate the reception and positioning of cargo.

DESCRIPTION OF THE PRIOR ART

A known means of loading an aircraft with cargo, in particular with containers, is to provide on the floor of the aircraft, or on a corresponding loading deck, floor units within which balls, rollers or in some cases power-driven rollers are mounted.

A floor unit holding ball elements has been disclosed in German patent DE 34 21 345. The floor unit described there comprises a floor plate plus several extruded profiles with openings to receive the ball elements. In the floor unit shown there, the multiple extruded profiles are connected to one another by means of a common floor plate. The connection is implemented by sheet-metal strips on the cover-plate side.

In the known floor unit, although the individual extruded profiles are relatively stable the floor unit as a whole, assembled by way of floor plate and sheet-metal strips, is relatively unstable.

SUMMARY OF THE INVENTION

The object of the present invention is to provide an improved floor unit with greater intrinsic stability. In addition, a method of manufacturing such a floor unit is described.

According to a first aspect of the present invention there is provided a floor unit for the loading deck of an aircraft to facilitate the reception and positioning of cargo comprising a unitary hollow profile defined by a cover plate and a floor plate disposed parallel thereto, and a plurality of profile elements running in a long direction of the floor unit and separating the cover plate from the floor plate, the cover plate defining openings to receive ball element means.

The main advantage of this invention is that instead of several individually extruded profiles, which are inadequately connected by way of a common floor plate and several sheet-metal strips, a floor unit is provided with a base frame in the form of a unitary hollow profile which is advantageously formed in one piece.

A further advantageous feature is that the floor unit comprises a single cover plate which constitutes a bearing element for the structure as a whole. Such a floor unit with a continuous cover plate is simpler to manufacture and when installed gives a loading deck a visually pleasing appearance. It also prevents the entry of dirt or liquids that can occur with a cover plate made up of several parts. The advantages of this feature can be obtained even if the hollow profile is not formed in one piece as a single element but is made of a multiplicity of parts.

However, in a preferred embodiment the hollow profile constituting the base frame is constructed in one piece thus simplifying still further the manufacture of the unit.

Preferably, the profile elements are disposed perpendicularly to the cover plate and at least one pair of adjacent profile elements define a channel therebetween for the reception of ball elements which can be spaced apart in the long direction of the floor unit. It will be appreciated that in this channel region, the stability of the floor unit is particularly great, so that the loads transferred from the cargo onto the ball elements are reliably sustained. Advantageously, the profile elements are supported by the floor plate and are so constructed that they act as a stiffening means and transmit loads imposed on the ball elements to the floor plate. Preferably, the webs defining the profile elements are made sufficiently thick that no further measures need be taken to absorb the loads transferred to the ball elements.

Preferably also, a connecting profile is formed on at least one side wall of the floor unit by means of which connecting profile a second floor unit with a complementary connecting profile can be connected thereto. Advantageously the connecting profile has the form of a wedge which can be spring-fitted by insertion into a receptacle defined between the cover plate and floor plate of the floor unit, which receptacle may comprise a corresponding groove in the adjacent floor unit or the space defined between the cover and floor plates of said unit.

This arrangement provides an opportunity for a number of floor units to be attached to one another by a kind of tongue-and-groove connection. As a result, given that the attachment means are appropriately formed, floor units can be combined with one another in almost any desired configuration.

It is regarded as particularly advantageous to construct the unitary hollow profile that forms the base frame of the floor unit as an extruded component. This form of manufacture allows the base frame of the floor unit to be produced in a simple and comparatively inexpensive manner.

The relatively stable construction of the base frame also enables additional apertures to be provided in the cover plate and/or the floor plate or, where required, even in the sides of the frame. These apertures make it possible to attach to the unit mechanisms for use in the reception and positioning of cargo, for example driving or fixation devices such as a PDU or a latch. Preferably also, the floor plate defines relief holes in regions located between the profile elements so as to reduce the overall weight of the unit. The cross-sectional shape of the unit makes the extruded profile sufficiently stable despite such removal of material.

In order to increase the stability of the cover plate in the region of the channels to receive the ball elements, reinforcing ribs can be provided on the underside of the cover plate, within the channel. These reinforcing ribs are advantageously disposed in parallel with the long direction of the channel, so that they form retaining sections next to the openings which can be engaged by appropriately formed devices on the outer surface of the cup-shaped ball element. These reinforcing ribs thus improve both the stability of the floor unit and the retention of an inserted ball element.

According to second aspect of the present invention there is provided a method of manufacturing a floor unit according to the first aspect of the present invention and comprising the steps of:

extruding a unitary hollow profile comprising a cover plate and a floor plate to form a base frame for the floor unit, forming openings in the cover plate which openings are adapted to receive ball elements; and forming apertures in the cover plate which openings are adapted to receive mechanisms for use in the reception and positioning of cargo;

and comprising the additional step of inserting at least one ball element means into one of the aforesaid openings.

In this method, the base frame for the floor unit is manufactured by extrusion of a single hollow profile, rather than by the assembly of several separate pieces. In the subsequent processing of this profile, openings to receive the ball elements are produced, along with whatever additional apertures are required for a driving mechanism and/or a fixation device. Finally, all or only some of the openings are provided with ball elements. If some openings are not provided with ball elements, these can be closed off with suitably designed covers.

According to a third aspect of the present invention there is provided a carrier frame to enable mechanisms for use in the the reception and positioning of cargo to be attached to a floor unit defining apertures into which can be inserted such mechanisms, the carrier frame comprising a base plate, side walls disposed around the base plate which can contact edges of the hollow profile that define said apertures, and an attachment flange formed by a projection of the base plate outward beyond the side walls, which attachment flange makes contact with and can be attached to a lower surface of the floor plate.

The carrier frame can be attached to the floor unit by screwing or riveting the attachment flange of the carrier frame to the floor plate of the floor unit.

BRIEF DESCRIPTION OF THE DRAWINGS

The present invention will be now be described by means of an exemplary embodiment with reference to the attached drawings, wherein:

FIG. 2 is a sectional view of the floor unit along the line II—II in FIG. 1;

FIG. 3 is a perspective view diagonally from below of the floor unit shown in FIG. 1;

FIG. 5 is a sectional view of the floor unit along the line V—V in FIG. 4.

DESCRIPTION OF A PREFERRED EMBODIMENT

Figure 1:
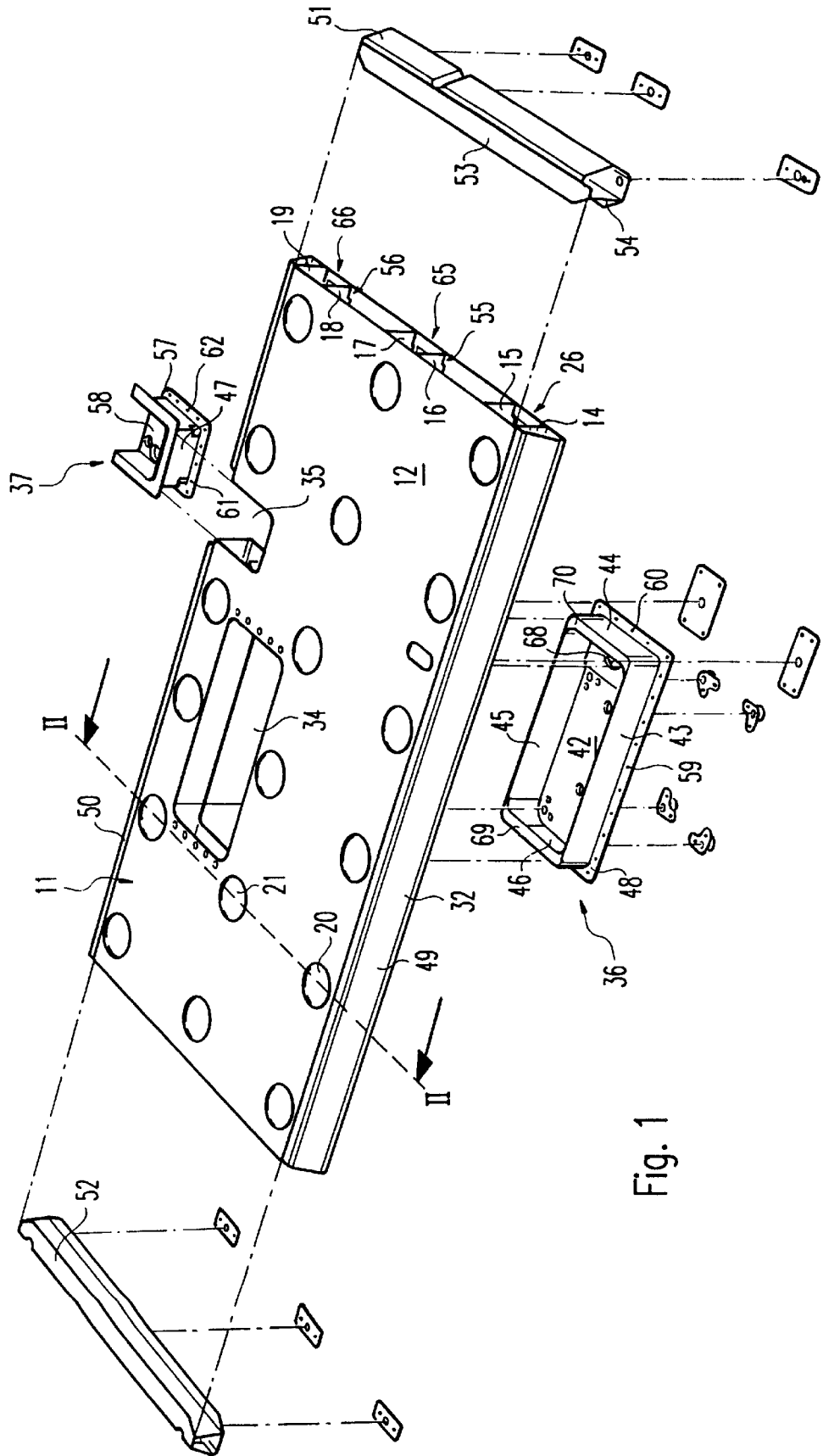
FIG. 1 is an exploded view of a floor unit in accordance with the invention.

In FIG. 1 an embodiment of the floor unit is shown in exploded view. The floor unit comprises of an extruded hollow profile 11 plus side profiles 51, 52, which close the open narrow sides of the hollow profile 11. A cover plate 12 of the floor unit is disposed in parallel with a floor plate 13. The cover plate 12 and floor plate 13 are joined together by way of vertically disposed profile webs 14, 15, 16, 17, 18 and 19. The cover plate 12 comprises receptacle openings 20, 21 to receive ball elements (not shown) that are known per se. These ball elements comprise of a substantially cylindrical cup within which a freely rotatable ball is so mounted that an upper segment of the ball projects above the cup (see the patent EP 0 413 897 A1). When the ball elements are inserted into the cover plate 12, each of the balls projects above the cover plate 12 by a predetermined amount, so that the uppermost points of the balls define a bearing plane over which a container cargo can be shifted and on which it can be seated.

The floor unit further comprises apertures 34, 35, each of which is here formed by openings in the cover plate 12 and the floor plate 13 that are vertically aligned with one another. These apertures 34, 35 serve to received carrier frames 36, 37. The carrier frame 36 is specially designed to receive a driving mechanism. Such a driving mechanism can comprise a powered roller that comes into operation when a load is imposed.

The carrier frame 37 is provided to receive other special functional units, for example fixation devices.

The carrier frames 36, 37 have side walls 43, 44, 45, 46 and 47, in each case matched to the shape of the corresponding apertures 34, 35, so that when installed the frames make contact with the edges of the apertures 34, 35 in the cover plate 12 and the floor plate 13 of the hollow profile 11. In addition, the carrier frames 36, 37 each comprise a base plate 42, 58 positioned below the side walls and extending beyond them so as to form an attachment flange 48, 57. The side walls 43, 44, 45, 46 and 47 are arranged perpendicular to the associated base plates 42, 58 in the carrier frame illustrated here.

In the attachment flanges 48, 57 of each of the base plates 42, 58 are bores 59, 60, 61 and 62 through which the carrier frames 36, 37, after they have been put into position, can be screwed or riveted to the floor plate 13 of the floor unit.

The side walls of the floor unit shown in FIG. 1 are formed by the above-mentioned side profiles 51, 52 on the narrow sides and by additional side profiles 49, 50 on the long sides. Each side profile comprises a connecting wedge-shaped profile 32. The connecting profile 32 is so constructed that it can be spring-fitted by insertion between the cover and floor plates of another floor unit. The floor unit to be so connected must be open on the connection side in such a way as to form a groove or the like between its cover and floor plates.

It should also be noted that in the present case, the side profiles 49, 50 on the long sides are made integral with the cover plate 12 and the floor plate 13. That is, here the side profiles 49, 50, cover plate 12, floor plate 13 and profile webs 14, 15, 16, 17, 18 and 19 are formed by a single hollow profile.

Alternatively, the side profiles 49, 50 can be reversibly attached to the long sides of the floor unit, for example by way of the outer profile webs 14, 19.

It should also be pointed out that the means of attachment of the side profiles 51, 52 to the narrow sides of the floor unit is particularly simple and efficient. This is an important feature of the invention and in the following will be described with reference to side profile 51. The side profile 51 comprises strips 53, 54 on the side toward the hollow profile 11. These strips 53, 54 are disposed parallel to one another and separated by an amount such that they can be pushed between the cover plate 12 and floor plate 13 of the hollow profile. When so inserted, the outer surfaces of the strips 53, 54 are in contact with the inner surfaces of the cover plate 12 and floor plate 13, respectively. To enable the insertion of the strips 53, 54 of the side profile 51, the ends of the profile webs 14, 15, 16, 17, 18 and 19 are provided with slitlike cutouts 55, 56, each with a depth corresponding to the width of the attachment strips. The slitlike cutouts 55, 56 are positioned at the ends of the profile webs 14, 15, 16, 17, 18 and 19 directly above or below the inner surface of the floor or cover plate, respectively. The profile webs 14, 15, 16, 17, 18 and 19 provide an additional, firm seating for the strips 53, 54 of the side profile 51.

In FIG. 2 a section through the hollow profile 11 is shown, along the line II—II in FIG. 1. As explained above with reference to FIG. 1, cover plate 12 and floor plate 13 are disposed parallel to and separated from one another. To achieve this separation, cover plate 12 and floor plate 13 are connected together by way of six profile webs 14, 15, 16, 17, 18 and 19. The profile webs 14, 15, 16, 17, 18 and 19 in the embodiment described here are each disposed perpendicular to the cover plate 12 and floor plate 13. However, in principle the profile webs 14, 15, 16, 17, 18 and 19 could also be slanted away from the vertical. The profile webs run parallel to one another in the long direction of the floor unit. They are arranged in pairs, such that between the two members of each pair a channel is formed. This arrangement produces a right, middle and left channel 66, 65, 26, each of which serves to receive ball elements. For this purpose, in the cover plate 12 above the channels 66, 65, 26 there are receptacle openings 20, 21 through which ball elements can be inserted. These receptacle openings 20, 21 are regularly spaced in the long direction of the floor unit (cf. FIG. 1).

It should be noted that there is no need to insert a ball element into each of the receptacle openings that are provided. When some of the receptacle openings are equipped with ball elements and others not, the latter can be closed with suitably shaped covers.

The side walls on the long sides of the floor unit are formed by side profiles 49, 50 constructed as integral parts of the hollow profile 11. The side profiles 49, 50 are tapered to form a kind of spring-fit wedge. They also comprise opposed connecting surfaces 63, 64, separated from one another by about the same amount as the inner surfaces of the cover plate 12 and floor plate 13 of the hollow profile 11. Hence a similarly constructed hollow profile 11, in particular one in which the inner surfaces of cover plate 12 and floor plate 13 are the same distance apart, can be connected by way of said connecting surfaces.

Such a connectable hollow profile 11 could comprise of the structure that would be obtained by cutting the profile shown in FIG. 2 just inside the profile web 18, so as to remove the part with profile webs 18, 19 (cf. line A in FIG. 2). A profile modified in this way would comprise only two channels 26, 65 with four profile webs 14,15, 16 and 17, so that a composite floor unit formed by connecting the two profiles together would contain five longitudinally arranged rows of ball elements or openings for ball elements. One way to obtain an "extension profile" of this kind is as mentioned above, by cutting through the basic profile described here in the long direction, along the line A (FIG. 2). Alternatively, the extension profile could be manufactured directly as a correspondingly shaped extruded profile.

In the hollow profile 11 shown here, longitudinal reinforcing ribs 41 are disposed in the channels 26, 65, 66 on the lower surface 40 of the cover plate 12. Their function is, firstly, to strengthen the cover plate 12 against the loads transferred by the ball elements. In addition, the reinforcing ribs along the edges of the receptacle openings 20, 21 serve as retaining devices for the ball elements, which can be engaged by catch devices provided on the outer circumference of the ball elements. The reinforcing ribs 41 thus also improve the fixation of the ball elements in the receptacle openings 20, 21.

Mention should also be made of the reinforcing ribs 71 visible in FIG. 2 on the floor plate 13, in the channels 26, 65, 66. These reinforcing ribs 71 are preferably disposed on the upper surface of the floor plate 13, so that they extend upward.

These serve to receive and transmit the force from the ball element that rests on the reinforcing ribs 71 ("standing ball element").

The profile shown in FIG. 2 is highly stable, with a relatively low weight. The main stability-increasing feature is that cover plate 12, the profile webs 14, 15, 16, 17, 18 and 19 and the floor plate 13 are all connected to one another and, more preferably formed in one piece. However, the cover plate 12 in itself increases stability inasmuch as it extends substantially over the entire floor unit. The profile shown in FIG. 2 can be relatively inexpensively produced as an extruded profile and constitutes a base frame for the floor unit into which the receptacle openings 20, 21 and the apertures 34, 35 can easily be incorporated. The floor unit can therefore be pre-assembled as a complete unit, which in turn considerably reduces the installation times at the erection site in the aircraft.

FIG. 3 shows the floor unit in perspective, as viewed at an angle from below. Here the carrier frame 36 for the driving mechanism (PDU) and the carrier frame 37 for the fixation device have been inserted into the corresponding apertures 34, 35. The side profiles 51, 52 at the narrow sides of the hollow profile 11 have also been inserted. In the region between the channels 26, 65, 66 material has been removed from the floor plate 13 to form relief holes 38, 39, which reduce the weight of the floor unit with no appreciable loss of stability. The relief holes 38, 39 also enable liquids to drain out and/or air to circulate, so that the floor unit in the form of a hollow profile 11 can be kept dry.

As can further be seen in FIG. 3, the base plate 42 of the carrier frame 36 for the driving mechanism (PDU) incorporates a hole 68 through which cables from the driving mechanism (not shown) can be passed.

Figure 4:
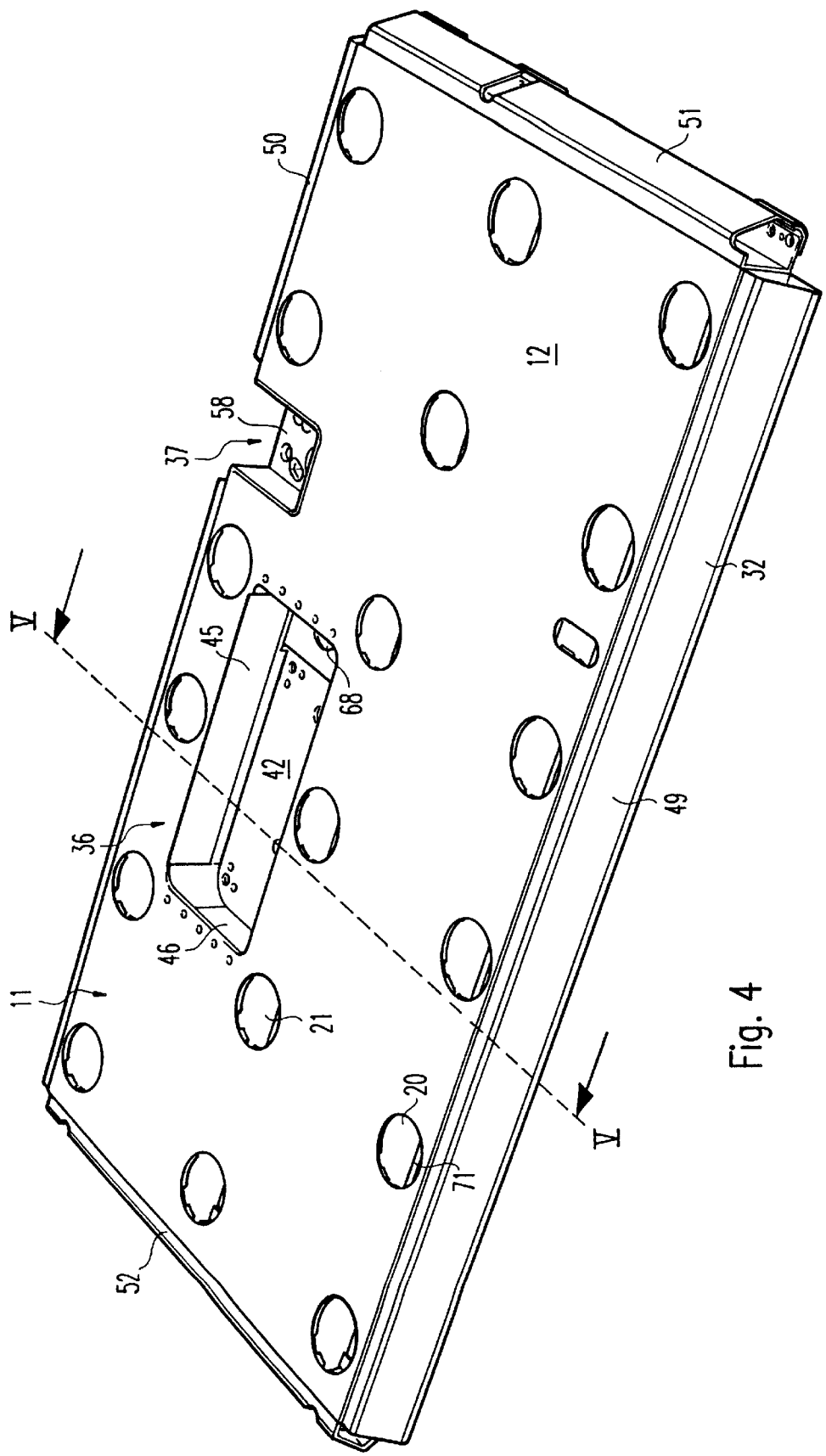
FIG. 4 is a perspective view diagonally from above of the floor unit shown in FIG. 1.

In FIG. 4 the floor unit of FIG. 3 is shown in perspective as viewed at an angle from above. The carrier frame 36 for the driving mechanism (PDU) has been inserted into the floor unit. The effect is to create a trough-like recess in the floor unit, into which a driving mechanism can be set. By insertion of the carrier frame 37 an additional recess is created in the floor unit to accommodate another functional unit, such as a fixation device.

In FIG. 5 the floor unit is shown in section, along the line V—V in FIG. 4. This sectional view differs from that in FIG. 2 mainly in that the section here passes through a region in which the cover plate 12 has no receptacle openings 20, 21 to receive ball elements. Hence the channels 26, 65, 66 are closed in the view shown in FIG. 5.

This sectional view further shows the inserted carrier frame 36 for the driving mechanism. The side walls 43, 45 of the carrier frame 36 here are directly apposed to the adjacent profile webs 17, 18. The upper edges of the side walls 43, 45 abut against the lower surface 40 of the cover plate 12, which extends beyond the profile webs 18, 19 in such a way that the edge of the aperture 34 in the cover plate 12 is flush with the inner surface of the side walls 43, 45 of the carrier frame. The attachment flange 48 of the base plate 42 makes contact with the outer surface of the floor plate 13 and is (cf. FIG. 3) riveted or screwed to the floor plate 13.

It is advantageous for attachment flanges 69, 70 also to be present at the upper end of the side walls 46, 44. By way of the attachment flanges 69, 70 at the upper end of the side walls 46, 44 the carrier frame 36 can be fixed to the lower surface 40 of the cover plate 12, preferably riveted or screwed.

What is claimed is:

1. A floor unit for the loading deck of an aircraft to facilitate the reception and positioning of cargo comprising:
   a unitary hollow profile including a cover plate, a floor plate disposed parallel thereto, and
   a plurality of profile elements separating the cover plate from the floor plate and defining a plurality of spaced apart channels, wherein the cover plate has a plurality of openings to receive ball element means in each of said spaced apart channels.

2. A floor unit as claimed in claim 1, wherein the unitary hollow profile has a height, a wider width, and still longer length, and wherein the profile elements are disposed perpendicularly to the cover plate and adjacent profile elements define a channel therebetween for the reception of ball, wherein said channels are spaced apart in the width direction of the floor unit.

3. A floor unit as claimed in claim 1, wherein the profile elements are supported by the floor plate and are so constructed that they act as a stiffening means and transmit loads imposed on the ball element means to the floor plate.

4. A floor unit as claimed in claim 1, wherein a connecting profile is formed on at least one side wall of the floor unit by means of which connecting profile a second floor unit with a complementary connecting profile can be connected thereto.

5. A floor unit as claimed in claim 4, wherein the connecting profile has the form of a wedge which can be spring-fitted by insertion into a receptacle defined between the cover plate and floor plate of the floor unit.

6. A floor unit as claimed in claim 1, wherein unitary hollow profile comprises an extruded component.

7. A floor unit as claimed in claim 1, wherein the hollow profile defines apertures into which can be inserted mechanisms for use in the the reception and positioning of cargo.

8. A floor unit as claimed in claim 1, wherein the floor plate defines relief holes in regions located between the profile elements.

9. A floor unit as claimed in claim 2, wherein at least one reinforcing rib is provided on a lower surface of the cover plate facing the channel.

10. A floor unit as claimed in claim 2, wherein at least one reinforcing rib is provided on an upper surface of the floor plate facing the channel.

11. A method of manufacturing a floor unit, comprising the steps of:

extruding a unitary hollow profile comprising a cover plate, a floor plate to form a base frame for the floor unit, and a plurality of profile elements separating the cover plate from the floor plate, and defining a plurality of spaced apart channels, forming openings in the cover plate which openings are adapted to receive ball element means; and forming apertures in the cover plate which apertures are adapted to receive mechanisms for use in the reception and positioning of cargo; and comprising the additional step of inserting at least one ball element into one of the aforesaid openings.

12. A method as claimed in claim 11, which comprises the further additional step of inserting at least one of a driving mechanism and a fixation mechanism into one of the aforesaid apertures.

13. A carrier frame to enable mechanisms for use in the reception and positioning of cargo to be attached to a floor unit, the floor unit comprising:

a unitary hollow profile including a cover plate, a floor plate disposed parallel thereto, and a plurality of profile elements separating the cover plate from the floor plate and defining a plurality of spaced apart channels, wherein the cover plate has a plurality of openings to receive ball element means in each of said spaced apart channels; and wherein the hollow profile further defines apertures into which can be inserted mechanisms for use in the reception and positioning of cargo, wherein said apertures further comprise:

a base plate side walls disposed around the base plate which can contact edges of the hollow profile that define said apertures, and an attachment flange formed by a projection of the base plate outward beyond the side walls, which attachment flange makes contact with and can be attached to a lower surface of the floor plate.

14. A floor unit for the loading deck of an aircraft to facilitate the reception and positioning of cargo comprising:

an integral and hollow floor member including a cover plate and a floor plate disposed parallel thereto, and a plurality of profile elements integrally interconnecting and separating said cover plate from said floor plate, said profile elements extending parallel to one another and disposed in pairs to define a channel between each pair, said floor member including a plurality of said pairs to define a plurality of said channels, the space between adjacent pairs of profile elements being greater than the space between said profile elements of each pair, said cover plate defining a plurality of openings spaced along each channel to receive ball element means.

15. A method of manufacturing a floor unit, comprising the steps of:

extruding an integral and hollow floor member comprising a cover plate, a floor plate, and a plurality of profile elements integrally interconnecting and separating the cover plate from the floor plate with the profile elements extending parallel to one another and disposed in pairs to define a channel between each pair, forming the floor member with a plurality of the pairs to define a plurality of the channels, and with the space between adjacent pairs of profile elements being greater than the space between the profile elements of each pair, and forming a plurality of openings spaced along each channel to receive ball element means.

* * * * *